United States Patent
Toda et al.

(10) Patent No.: US 9,748,556 B2
(45) Date of Patent: Aug. 29, 2017

(54) NEGATIVE ELECTRODE MATERIAL FOR SECONDARY BATTERY, AND SECONDARY BATTERY

(71) Applicants: Akio Toda, Tokyo (JP); Kimiyoshi Fukatsu, Tokyo (JP); Ryota Yuge, Tokyo (JP); Shinji Fujieda, Tokyo (JP)

(72) Inventors: Akio Toda, Tokyo (JP); Kimiyoshi Fukatsu, Tokyo (JP); Ryota Yuge, Tokyo (JP); Shinji Fujieda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/389,514

(22) PCT Filed: Mar. 6, 2013

(86) PCT No.: PCT/JP2013/056130
§ 371 (c)(1),
(2) Date: Sep. 30, 2014

(87) PCT Pub. No.: WO2013/146144
PCT Pub. Date: Oct. 3, 2013

(65) Prior Publication Data
US 2015/0118566 A1    Apr. 30, 2015

(30) Foreign Application Priority Data
Mar. 30, 2012    (JP) .................. 2012-082756

(51) Int. Cl.
*H01M 4/133* (2010.01)
*C01B 31/04* (2006.01)
*H01M 4/36* (2006.01)
(Continued)

(52) U.S. Cl.
CPC ............ *H01M 4/133* (2013.01); *C01B 31/04* (2013.01); *H01M 4/36* (2013.01); *H01M 4/587* (2013.01);
(Continued)

(58) Field of Classification Search
CPC .. H01M 4/133; H01M 2004/027; H01M 4/02; H01M 4/1391
See application file for complete search history.

(56) References Cited

U.S. PATENT DOCUMENTS

2004/0229041 A1* 11/2004 Zou et al. ................ 428/408
2009/0181311 A1   7/2009 Iwanaga et al.
(Continued)

FOREIGN PATENT DOCUMENTS

EP    2 413 404 A1    2/2012
JP    H04-368778 A    12/1992
(Continued)

OTHER PUBLICATIONS

Shi et al. (J. Electrochem. Soc., vol. 143, No. 11, Nov. 1996 p. 3466-3472).*
(Continued)

*Primary Examiner* — Olatunji Godo
(74) *Attorney, Agent, or Firm* — Wilmer Cutler Pickering Hale and Dorr LLP

(57) ABSTRACT

The present invention relates to a negative electrode material for secondary batteries, comprising graphite; wherein
the graphite comprises hexagonal crystal graphite and rhombohedral crystal graphite, and has a low-crystalline carbon coating on a surface thereof; and
the graphite has exothermic peaks in the range of 600° C. or lower and in the range of 690° C. or higher in DTA measurement, or the graphite has a full width at half maximum of a (101) peak of the hexagonal crystal graphite of 0.2575° or less in XRD measurement, or the graphite has an absolute value of the difference between the lattice strain obtained from (101) plane spacing of the hexagonal crystal graphite and the lattice strain obtained from (100) plane spacing of the hexagonal crystal graphite of $7.1 \times 10^{-4}$ or less in XRD measurement.

7 Claims, 3 Drawing Sheets

(51) Int. Cl.
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

2010/0178563 A1    7/2010    Ozaki et al.
2012/0064403 A1    3/2012    Kameda et al.

FOREIGN PATENT DOCUMENTS

| | | |
|---|---|---|
| JP | 2003-308838 A | 10/2003 |
| JP | 2007-305625 A | 11/2007 |
| JP | 2008-300274 A | 12/2008 |
| JP | 2010-251314 A | 11/2010 |
| WO | WO-2007/139130 A1 | 12/2007 |
| WO | WO-2010/110443 A1 | 9/2010 |
| WO | WO-2012/039477 A1 | 3/2012 |

OTHER PUBLICATIONS

Huang et al. (Solid State Ionics 110 (1998) 173-178).*
Moon et al. (J. Ind. Eng. Chem., vol. 11, No. 4, (2005) 594-602).*
Zhang et al. (Journal of Power Sources 174 (2007) 766-769).*
Howe et al. (Powder Diffraction 18 (2), Jun. 2003).*
International Search Report corresponding to PCT/JP2013/056130, dated Jun. 4, 2013 (5 pages).

\* cited by examiner

NEGATIVE ELECTRODE MATERIAL FOR SECONDARY BATTERY, AND SECONDARY BATTERY

CROSS-REFERENCE TO RELATED APPLICATIONS

This application is a national stage application of International Application No. PCT/JP2013/056130 entitled "Negative Electrode Material for Secondary Battery, and Secondary Battery," filed on Mar. 6, 2013, which claims the benefit of the priority of Japanese patent application No. 2012-082756, filed on Mar. 30, 2012, the disclosures of each of which are hereby incorporated by reference in their entirety.

TECHNICAL FIELD

The present invention relates to a negative electrode material for secondary batteries, and more specifically a negative electrode material for secondary batteries comprising graphite having a low-crystalline carbon coating.

BACKGROUND ART

Lithium ion secondary batteries have excellent properties such as high energy density, high operating voltage, and less deterioration caused by charge and discharge cycle(s), and therefore have been widely used for portable information terminals including cellular phone and notebook computer, and for industrial equipment. Their applications to electric vehicle, electric power storage, and the like, which may be realized by a larger lithium ion secondary battery, is expected in the future, and researches and developments are conducted for the applications.

At present, graphite is commonly used as a negative electrode active material for lithium ion secondary batteries. However, when graphite is used as a negative electrode active material, the decomposition reaction of the electrolyte may occur at the electrode/electrolyte interface, resulting in the reduction in capacity.

In order to solve the problem, Patent Literatures 1 and 2, for example, propose that graphite be coated with amorphous carbon or low-crystalline carbon. That may prevent direct contact of the electrolyte with the surface of graphite, thereby suppressing the decomposition reaction of the electrolyte.

CITATION LIST

Patent Literature

Patent Literature 1: Japanese Patent Laid-Open No. H04-368778
Patent Literature 2: Japanese Patent Laid-Open No. 2003-308838

SUMMARY OF INVENTION

Technical Problem

As described above, the graphite having a low-crystalline carbon coating, which is disclosed in Patent Literatures 1 and 2, may prevent direct contact of the electrolyte with the surface of graphite by the low-crystalline carbon coating, and thereby the decomposition reaction of the electrolyte may be suppressed. However, the internal graphite and the low-crystalline carbon coating are not sufficiently studied in some points. Meanwhile, as a negative electrode material for secondary batteries, there is a need for an improvement in long-term reliability of battery, in particular.

The object of the present invention is to solve the problem as described above, and to provide a negative electrode material for secondary batteries, which comprises graphite having a low-crystalline carbon coating and may provide a secondary battery having less reduction in capacity after long-term use.

Solution to Problem

The first embodiment of the present invention relates to a negative electrode material for secondary batteries, comprising graphite; wherein
the graphite comprises hexagonal crystal graphite and rhombohedral crystal graphite, and has a low-crystalline carbon coating on a surface thereof; and
the graphite has exothermic peaks in the range of 600° C. or lower and in the range of 690° C. or higher in DTA measurement.

The second embodiment of the present invention relates to a negative electrode material for secondary batteries, comprising graphite; wherein
the graphite comprises hexagonal crystal graphite and rhombohedral crystal graphite, and has a low-crystalline carbon coating on a surface thereof; and
the graphite has a full width at half maximum of a (101) peak of the hexagonal crystal graphite of 0.2575° or less in XRD measurement.

The third embodiment of the present invention relates to a negative electrode material for secondary batteries, comprising graphite; wherein
the graphite comprises hexagonal crystal graphite and rhombohedral crystal graphite, and has a low-crystalline carbon coating on a surface thereof; and
the graphite has an absolute value of the difference between the lattice strain obtained from (101) plane spacing of the hexagonal crystal graphite and the lattice strain obtained from (100) plane spacing of the hexagonal crystal graphite of $7.1 \times 10^{-4}$ or less in XRD measurement.

The present invention also relates to a negative electrode for secondary batteries, comprising any one of the above-described graphites as a negative electrode active material.

The present invention also relates to a secondary battery comprising the above-described negative electrode for secondary batteries.

Advantageous Effects of Invention

According to the present invention, there may be provided a negative electrode material for secondary batteries which comprises graphite having a low-crystalline carbon coating, and may provide a secondary battery having less reduction in capacity after long-term use and having excellent long-term reliability. In addition, according to the present invention, there may be provided a secondary battery, including lithium ion secondary battery, which has excellent long-term reliability.

DESCRIPTION OF EMBODIMENTS

Figure 1:
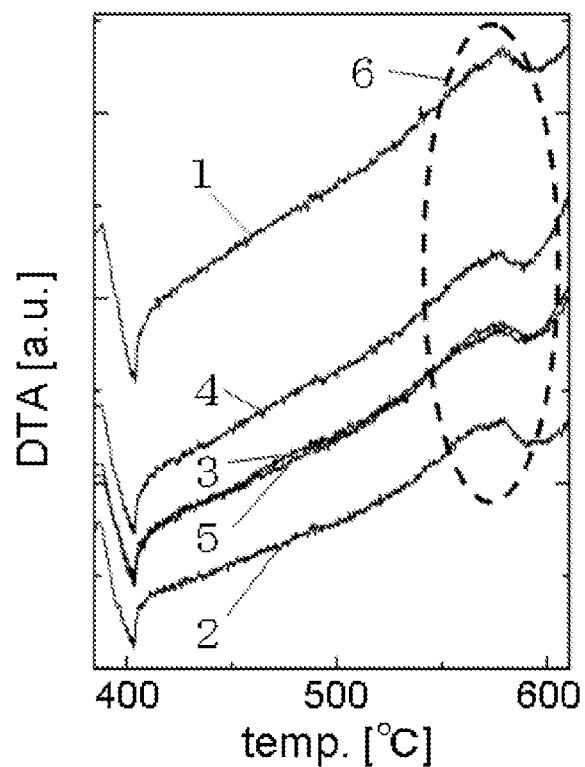
FIG. 1 is DTA spectra in a lower temperature region of graphite having a low-crystalline carbon coating.

The negative electrode material for secondary batteries of the present invention comprises graphite comprising hexagonal crystal graphite and rhombohedral crystal graphite, and having a low-crystalline carbon coating on a surface thereof. The term "having a low-crystalline carbon coating" as used herein means that the surface of graphite is coated with carbon having a crystallinity lower than the crystallinity of graphite, or amorphous carbon. In addition, the graphite (graphite coated with low-crystalline carbon) that is a negative electrode material for secondary batteries of the present invention has any one or more of the following properties (1) to (3), preferably all of the properties (1) to (3).

(1) The graphite has exothermic peaks in the range of 600° C. or lower, preferably 570 to 590° C., and in the range of 690° C. or higher, preferably 700° C. or higher, more preferably 710 to 730° C., in DTA measurement.

(2) The graphite has a full width at half maximum of a (101) peak of the hexagonal crystal graphite of 0.2575° or less, preferably 0.257° or less, more preferably 0.2565° or less, in XRD measurement.

(3) The graphite has an absolute value of the difference between the lattice strain obtained from (101) plane spacing of the hexagonal crystal graphite and the lattice strain obtained from (100) plane spacing of the hexagonal crystal graphite of $7.1 \times 10^{-4}$ or less, preferably $7.0 \times 10^{-4}$ or less, more preferably $6.9 \times 10^{-4}$ or less, in XRD measurement.

For the use of the graphite having a low-crystalline carbon coating (graphite coated with low-crystalline carbon) as a negative electrode active material, it is necessary to grasp and control the properties of the surface coating and the graphite. As for the crystallinity and the thermal properties of graphite, a graphite having a low-crystalline carbon coating (graphite coated with low-crystalline carbon) which has any one or more of the above-described properties (1) to (3), preferably all of the properties (1) to (3), may have a good crystallinity of the internal graphite, and a secondary battery comprising the graphite as a negative electrode active material may have excellent long-term reliability.

The DTA (Differential Thermal Analysis) measurement and the XRD measurement will be described in Examples in detail.

Such a graphite (graphite coated with low-crystalline carbon) that is the negative electrode material for secondary batteries of the present invention may be produced, for example, by mixing/stirring graphite as a core material and a carbon precursor which is a material for the surface coating, for example, heavy oil or a resin. As a material for the graphite which is the core material, natural graphite obtained by removing impurities from a naturally-produced ore, or artificial graphites obtained by subjecting various organic materials to heat treatment may be used. Examples of the method for stirring include a method using a ribbon mixer. The conditions such as temperature, time, and atmosphere during stirring may be selected depending on the components of the materials (the core material and the carbon precursor), the amount of the coating, and the like. The carbon material thus obtained is calcined, for example, at a temperature of about 600° C. to about 2,500° C., so that the surface of the graphite is coated with low-crystalline carbon. The surface coating of low-crystalline carbon may be also achieved by a process in which a material in gaseous form is used such as chemical vapor deposition. In addition, the graphite may be pulverized in advance to adjust the size or the crystallinity of the core material. Examples of the method for pulverization include a method using a ball mill. As described above, there are many options for the materials and the production process to provide the graphite coated with low-crystalline carbon of the present invention. Thus, in the present invention, the method for producing the graphite having any one or more of the properties (1) to (3), preferably all of the properties (1) to (3) should not be limited. It is important that the produced graphite has any one or more of the properties (1) to (3), preferably all of the properties (1) to (3).

Next, the secondary battery of the present invention will be described. The secondary battery of the present invention is characterized in that the graphite that is a negative electrode material for secondary batteries of the present invention, namely, the graphite comprising hexagonal crystal graphite and rhombohedral crystal graphite, and having a low-crystalline carbon coating on a surface thereof, and having any one or more of the properties (1) to (3), preferably all of the properties (1) to (3) is used as a negative electrode active material.

The secondary battery of the present invention, for example, comprises a positive electrode obtained by forming a layer containing a positive electrode active material on a positive electrode collector, and a negative electrode obtained by forming a layer containing a negative electrode active material (the graphite that is a negative electrode material for secondary batteries of the present invention) on a negative electrode collector, and the positive electrode and the negative electrode are placed opposite to each other with a porous separator comprising an electrolyte between the electrodes. The porous separator is placed in nearly parallel with the layer containing the negative electrode active material and the layer containing the positive electrode active material.

Examples of the shape of the secondary battery of the present invention include, but not limited to, a cylindrical type, a rectangular type, a coin type, and a laminate package.

The negative electrode of the secondary battery of the present invention comprises the graphite as described above as a negative electrode active material. For example, a negative electrode prepared by applying a mixture, which is prepared by dispersing/kneading the graphite that is a negative electrode material for secondary batteries of the present invention, a conductive material such as carbon black, and a binder such as polyvinylidene fluoride (PVdF) in a solvent such as N-methyl-2-pyrrolidone (NMP), on a base (negative electrode collector) such as a metal foil may be used.

As for the positive electrode of the secondary battery of the present invention, a positive electrode prepared by applying a mixture, which is prepared by dispersing/kneading any material capable of intercalating/deintercalating lithium such as a composite oxide of $Li_xMO_2$ (wherein M represents at least one transition metal), for example, and more specifically, $Li_xCoO_2$, $Li_xNiO_2$, $Li_xMn_2O_4$, $Li_xMnO_3$, and $Li_xNi_yCo_{1-y}O_2$, a conductive material such as carbon black, and a binder such as PVdF in a solvent such as N-methyl-2-pyrrolidone (NMP), on a base (positive electrode collector) such as a metal foil may be used.

The secondary battery of the present invention may be produced by, in dry air or in an inert gas atmosphere, laminating the negative electrode and the positive electrode with a separator between the electrodes, and optionally winding the resulting laminate, and then housing the laminate in a battery can, or alternatively, sealing the laminate with a flexible film consisting of a laminate of a synthetic resin and a metal foil, or the like.

A porous film of polyolefin such as polypropylene and polyethylene, fluororesin, or the like may be suitably used as the separator.

As the electrolyte used in the present invention, an electrolyte prepared by dissolving a lithium salt in an aprotic organic solvent, or a mixture of two or more of aprotic organic solvents may be used, the aprotic organic solvent including cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, and ethyl propionate; γ-lactones such as γ-butyrolactone; chain ethers such as 1,2-ethoxy ethane (DEE), and ethoxy methoxy ethane (EME); cyclic ethers such as tetrahydrofuran, and 2-methyltetrahydrofuran; dimethyl sulfoxide, 1,3-dioxolane, formamide, acetoamide, dimethylformamide, dioxolane, acetonitrile, propionitrile, nitromethane, ethyl monoglyme, phosphate triester, trimethoxy methane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sulfone, anisole, N-methyl pyrrolidone, and fluorinated carboxylic acid esters, for example. Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, lower aliphatic lithium carboxylates, chloroborane lithium, lithium tetraphenylborate, LiBr, LiI, LiSCN, LiCl, and imides. In addition, a polymer electrolyte may be used instead of the electrolyte.

Any conventionally-known structure and material may be used for the secondary battery of the present invention, with the proviso that the negative electrode active material is the graphite that is the negative electrode material for secondary batteries of the present invention, and the secondary battery of the present invention is not limited to the ones described above. The secondary battery of the present invention may be produced by any conventionally-known process.

EXAMPLES

Examples 1 to 5

(Production of Graphites A to E)

Five samples of graphite having different crystallinity (Graphites A to E, each having a low-crystalline carbon coating) were produced as follows.

First, graphite as the starting material was pulverized and classified to adjust the size of the core material. And then, the graphite as the core material and a carbon precursor which is a material for the surface coating were mixed and stirred, and then the mixture was calcined, to provide Graphite A to E, each having a low-crystalline carbon coating. The conditions of pulverization and stirring were appropriately controlled to adjust the crystallinity of the graphite.

(DTA Measurements of Graphites A to E)

The DTA measurements of Graphites A to E were conducted to determine the thermal characteristics of the graphites having low-crystalline carbon coatings thus obtained.

The weight of each powder sample measured was about 3 mg. The flow rate of the gas during the measurement was set at 240 cc/min of nitrogen gas and 60 cc/min of oxygen gas. The temperature profile during the temperature-increasing step was set as follows. First, a stand-by time of 5 minutes was provided to stabilize the gas flow prior to the measurement. Subsequently, the measurement was conducted while increasing the temperature at a rate of 10° C./min from 20° C. to 400° C. And then, the temperature was maintained at 400° C. for 10 minutes after the temperature reached 400° C., and the measurement was conducted while increasing the temperature at a rate of 3° C./min from 400° C. to 900° C.

FIG. 1 shows the DTA spectra in a lower temperature region. The curves 1 to 5 are the DTA curves of Graphites A to E, respectively. A peak is observed at the position indicated by broken line 6 in every sample. Hereinafter, these peaks are referred to as "lower temperature peak".

Figure 2:
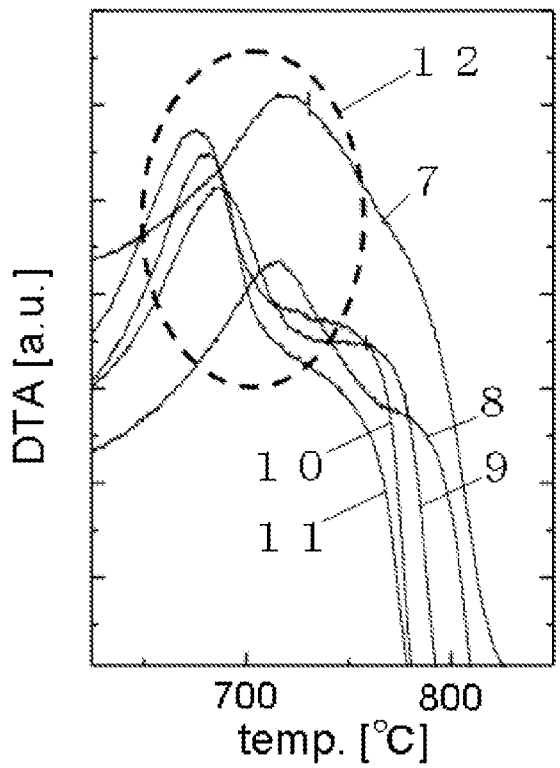
FIG. 2 is DTA spectra in a higher temperature region of graphite having a low-crystalline carbon coating.

FIG. 2 shows the DTA spectra in a higher temperature region. The curves 7 to 11 are the DTA curves of Graphites A to E, respectively. A peak is observed at the position indicated by broken line 12 in every sample. Hereinafter, these peaks are referred to as "higher temperature peak".

The temperatures of the lower temperature peaks and the temperatures of the higher temperature peaks of Graphites A to E in the DTA curves are summarized in Table 1.

TABLE 1

|  | Temperature of lower temperature peak (° C.) | Temperature of higher temperature peak (° C.) |
| --- | --- | --- |
| Graphite A | 582 | 720 |
| Graphite B | 580 | 717 |
| Graphite C | 576 | 676 |
| Graphite D | 578 | 687 |
| Graphite E | 577 | 681 |

The lower temperature peak located in the range of 600° C. or lower, more specifically from 576° C. to 582° C., is attributable to the combustion of the low-crystalline carbon coating. From the fact that the difference in the temperature of the lower temperature peak among the graphites is small, it is assumed that the properties of the low-crystalline carbon coating do not greatly differ among Graphites A to E.

On the other hand, the higher temperature peak located in the range of 690° C. or higher, more specifically from 676° C. to 720° C., is attributable to the combustion of the graphite. The temperature of the higher temperature peak ranges from 676° C. to 720° C., and the difference among the graphites is large, whereas the difference in the temperature of the lower temperature peak is small. The difference in the temperature of the higher temperature peak appears to reflect the difference in the crystallinity of the graphite.

(XRD Measurements of Graphites A to E)

The XRD measurements of Graphites A to E were conducted to evaluate the crystallinity of the graphite.

Figure 3:
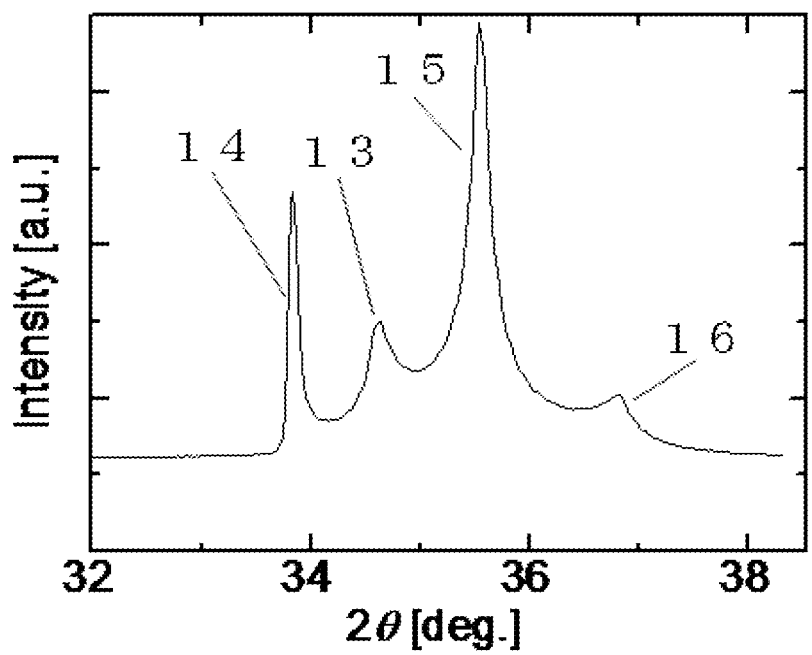
FIG. 3 is an XRD spectrum of graphite having a low-crystalline carbon coating.

The wavelength of the X-ray used for the measurement was 0.1241 nm. As an example, FIG. 3 shows the result of the measurement of Graphite A. The peak 14 at 2θ=33.88° is assigned to the (100) plane of hexagonal crystal graphite. The peak 13 at 2θ=34.66° is assigned to the (001) plane of rhombohedral crystal graphite. The peak 15 at 2θ=35.57° is assigned to the (101) plane of hexagonal crystal graphite. The peak 16 at 2θ=36.80° is assigned to the (011) plane of rhombohedral crystal graphite. Thus, Graphite A is not single-phase, and comprises rhombohedral crystal and hexagonal crystal. These peaks were observed in all of Graphites A to E.

Figure 4:
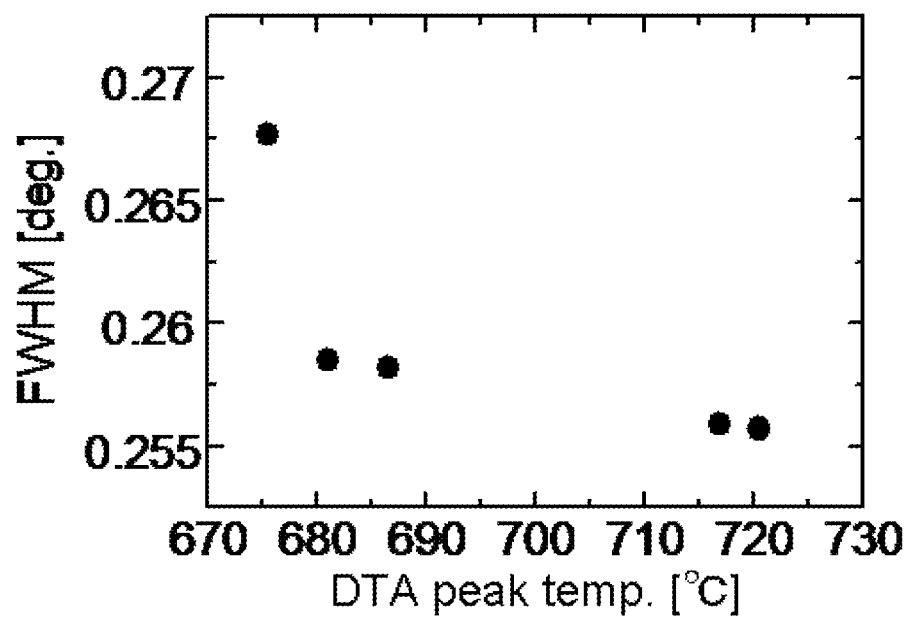
FIG. 4 is a graph showing the relation between the higher peak temperature in DTA measurement and the full width at half maximum of a (101) peak of hexagonal crystal graphite in the graphite having a low-crystalline carbon coating.

FIG. 4 shows the relation between the temperature of the higher temperature peak in the DTA measurement and the full width at half maximum of the (101) peak of hexagonal crystal graphite in the XRD measurement. It is revealed that the full width at half maximum is narrower as the temperature of the higher temperature peak in the DTA is higher. The full width at half maximums of Graphites A and B, in particular, were 0.256° or less.

A narrower full width at half maximum generally means that the crystallite size is greater and the variation in lattice strain among crystallites is smaller. In this sense, a narrower full width at half maximum reflects a better crystallinity of graphite. Thus, higher temperature of the higher temperature peak in the DTA appears to mean that the crystallinity of graphite is better.

Figure 5:
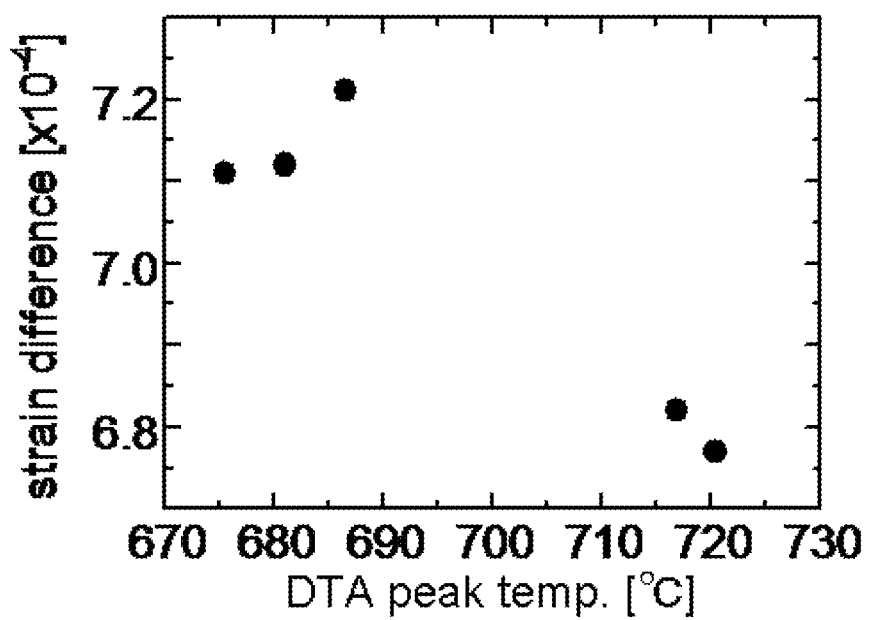
FIG. 5 is a graph showing the relation between the higher peak temperature in DTA measurement and the absolute value of the difference between the lattice strain obtained from (101) plane spacing of hexagonal crystal graphite and the lattice strain obtained from (100) plane spacing of hexagonal crystal graphite in the graphite having a low-crystalline carbon coating.

FIG. 5 shows the relation between the absolute value of the difference between the lattice strain obtained from (101) plane spacing of hexagonal crystal graphite and the lattice strain obtained from (100) plane spacing of hexagonal crystal graphite, and the temperature of the higher temperature peak in the DTA measurement.

The lattice strain obtained from (101) plane spacing of hexagonal crystal graphite, the lattice strain obtained from (100) plane spacing of hexagonal crystal graphite, and the absolute value of the difference between the values were determined as follows.

First, the 2θ value of the (101) peak of hexagonal crystal graphite and the 2θ value of the (100) peak of hexagonal crystal graphite are obtained from the XRD spectrum. These values are taken as $2θ_{(101)}$ and $2θ_{(100)}$, respectively. The lattice plane spacing $d_{(101)}$ of the (101) plane of hexagonal crystal graphite, and the lattice plane spacing $d_{(100)}$ of the (100) plane of hexagonal crystal graphite are determined from the values of $θ_{(101)}$ and $θ_{(100)}$ by the following equations.

$$d_{(101)}=λ/(2\sin(θ_{(101)}))$$

$$d_{(100)}=λ/(2\sin(θ_{(100)}))$$

These equations are derived by deforming the Bragg's equation: $2d \sin θ=λ$, wherein λ is the wavelength of the X-ray.

The lattice strain $ε_{(101)}$ in the (101) plane of hexagonal crystal graphite, and the lattice strain $ε_{(100)}$ in the (100) plane of hexagonal crystal graphite are calculated from the lattice spacings $d_{(101)}$ and $d_{(100)}$ thus determined according to the following equations.

$$ε_{(101)}=(d_{(101)}-d_{(101),0})/d_{(101),0}$$

$$ε_{(100)}=(d_{(100)}-d_{(100),0})/d_{(100),0}$$

wherein $d_{(101),0}$ is the lattice spacing of the (101) plane of hexagonal crystal graphite with no strain, and $d_{(100),0}$ is the lattice spacing of the (100) plane of hexagonal crystal graphite with no strain. In the specification, $d_{(101),0}$ is 0.2032 nm, and $d_{(100),0}$ is 0.2132 nm.

The absolute value of the difference between the lattice strain obtained from (101) plane spacing of hexagonal crystal graphite and the lattice strain obtained from (100) plane spacing of hexagonal crystal graphite |Δε| is determined from the lattice strains $ε_{(101)}$ and $ε_{(100)}$ thus determined by the following equation.

$$|Δε|=|ε_{(101)}-ε_{(100)}|$$

FIG. 5 revealed that graphite having a higher temperature of the higher temperature peak in the DTA has a smaller absolute value of the difference between the lattice strains |Δε|. The values of |Δε| of Graphites A and B, in particular, were $6.85×10^{-4}$ or less. The results suggest that graphite having a more uniform lattice strain of hexagonal crystal graphite comprised in the graphite is harder to burn.

(Production of Secondary Batteries Comprising Graphites A to E as Negative Electrode Active Material, and Evaluation of Long-Term Reliability)

A negative electrode sheet comprising each one of Graphites A to E as an active material was prepared as follows. Specifically, a negative electrode sheet was prepared by mixing the active material, PVdF and a conductive additive, and dispersing/kneading the mixture in NMP as a solvent; applying the kneaded mixture on a copper foil; and then drying and compressing the mixture. Meanwhile, a positive electrode sheet was prepared by mixing a positive electrode active material, PVdF and a conductive additive, and dispersing/kneading the mixture in NMP as a solvent; applying the kneaded mixture on an aluminum foil; and then drying and compressing the mixture. In addition, a solution prepared by dissolving 1 mol/L of $LiPF_6$ in a mixed solvent of EC and DEC was used as an electrolyte. A coin type secondary battery was produced using the negative electrode, the positive electrode, the electrolyte, and a separator. Using these coin type secondary batteries, charge/discharge cycle tests were conducted, and it was found that Graphites A and B exhibit higher long-term reliability as battery than other Graphites C, D and E.

With regard to the negative electrode material for secondary batteries wherein the graphite in which both hexagonal crystal graphite and rhombohedral crystal graphite are present is coated with low-crystalline carbon, the results as described above revealed the following. Specifically, (1) There is a correlation between the temperature of the higher temperature peak in the DTA, which is attributable to the combustion of the graphite, and two indexes to the crystallinity of the graphite: the full width at half maximum of the (101) peak of the hexagonal crystal graphite, and the difference between the lattice strain obtained from (101) plane spacing of the hexagonal crystal graphite and the lattice strain obtained from (100) plane spacing of the hexagonal crystal graphite.

(2) Secondary batteries comprising Graphites A and B as the negative electrode active material have higher long-term reliability, wherein the graphites have (i) the higher temperature peak in the DTA at a higher temperature (717° C. or higher); (ii) a narrower full width at half maximum of the (101) peak of the hexagonal crystal graphite (0.256° or less); and (iii) a smaller absolute value of the difference between the lattice strain obtained from (101) plane spacing of the hexagonal crystal graphite and the lattice strain (100) plane spacing of the hexagonal crystal graphite ($6.85×10^{-4}$ or less).

Thus, it is understood that the reliability of a lithium ion secondary battery may be improved when a graphite comprising hexagonal crystal graphite and rhombohedral crystal graphite, and having a low-crystalline carbon coating, and having any one or more of the following properties (1) to (3), preferably all of the properties (1) to (3) is used as a negative electrode material.

(1) The graphite has exothermic peaks in the range of 600° C. or lower and in the range of 690° C. or higher in DTA measurement.

(2) The graphite has a full width at half maximum of a (101) peak of the hexagonal crystal graphite of 0.2575° or less in XRD measurement.

(3) The graphite has an absolute value of the difference between the lattice strain obtained from (101) plane spacing of the hexagonal crystal graphite and the lattice strain obtained from (100) plane spacing of the hexagonal crystal graphite of $7.1 \times 10^{-4}$ or less in XRD measurement.

In the Examples, the DTA was used to evaluate the thermal characteristics of graphite having a low-crystalline carbon coating. Any other method, for example, thermogravimetry analysis (TGA) in which the change in weight with increasing temperature is measured, however, may be also used.

INDUSTRIAL APPLICABILITY

The secondary battery of the present invention may be used in any industrial field where power supply is needed, and in industrial fields related to transport, storage, and supply of electric energy. More specifically, the secondary battery may be used for power sources for mobile devices such as cellular phone and notebook computer; power sources for transfer/transport vehicles including electrically-powered vehicles such as electric vehicle, hybrid vehicle, electric motorcycle and power-assisted bicycle, electric train, satellite, and submarine; backup power sources such as UPS; power storage system to store electric power generated by solar power generation, wind power generation, or the like; and the like.

REFERENCE SIGNS LIST

1 DTA curve in lower temperature region of Graphite A having a low-crystalline carbon coating
2 DTA curve in lower temperature region of Graphite B having a low-crystalline carbon coating
3 DTA curve in lower temperature region of Graphite C having a low-crystalline carbon coating
4 DTA curve in lower temperature region of Graphite D having a low-crystalline carbon coating
5 DTA curve in lower temperature region of Graphite E having a low-crystalline carbon coating
6 Lower temperature peaks in DTA spectra of graphites having low-crystalline carbon coatings
7 DTA curve in higher temperature region of Graphite A having a low-crystalline carbon coating
8 DTA curve in higher temperature region of Graphite B having a low-crystalline carbon coating
9 DTA curve in higher temperature region of Graphite C having a low-crystalline carbon coating
10 DTA curve in higher temperature region of Graphite D having a low-crystalline carbon coating
11 DTA curve in higher temperature region of Graphite E having a low-crystalline carbon coating
12 Higher temperature peaks in DTA spectra of graphites having low-crystalline carbon coatings
13 Diffraction peak based on (100) plane of hexagonal crystal graphite in XRD spectrum of graphite having a low-crystalline carbon coating
14 Diffraction peak based on (001) plane of rhombohedral crystal graphite in XRD spectrum of graphite having a low-crystalline carbon coating
15 Diffraction peak based on (101) plane of hexagonal crystal graphite in XRD spectrum of graphite having a low-crystalline carbon coating
16 Diffraction peak based on (011) plane of rhombohedral crystal graphite in XRD spectrum of graphite having a low-crystalline carbon coating

The invention claimed is:

1. A negative electrode material for secondary batteries, comprising graphite; wherein
the graphite comprises hexagonal crystal graphite and rhombohedral crystal graphite, and has a low-crystalline carbon coating on a surface thereof; and
the graphite has a full width at half maximum of a (101) peak of the hexagonal crystal graphite of 0.2575° or less in XRD measurement,
wherein the graphite has exothermic peaks in the range of 570° C. to 590° C. and in the range of 710° C. to 730° C. in DTA measurement.

2. A negative electrode material for secondary batteries, comprising graphite; wherein
the graphite comprises hexagonal crystal graphite and rhombohedral crystal graphite, and has a low-crystalline carbon coating on a surface thereof; and
the graphite has an absolute value of the difference between the lattice strain obtained from (101) plane spacing of the hexagonal crystal graphite and the lattice strain obtained from (100) plane spacing of the hexagonal crystal graphite of $7.1 \times 10^4$ or less in XRD measurement,
wherein the graphite has exothermic peaks in the range of 570° C. to 590° C. and in the range of 710° C. to 730° C. in DTA measurement.

3. The negative electrode material for secondary batteries according to claim 2, wherein the graphite has a full width at half maximum of a (101) peak of the hexagonal crystal graphite of 0.2575° or less in XRD measurement.

4. A negative electrode for secondary batteries, comprising the graphite according to claim 1 as a negative electrode active material.

5. A secondary battery, comprising the negative electrode according to claim 4.

6. A negative electrode for secondary batteries, comprising the graphite according to claim 2 as a negative electrode active material.

7. A secondary battery, comprising the negative electrode according to claim 6.

* * * * *